United States Patent [19]

Wang et al.

[11] Patent Number: 4,499,255
[45] Date of Patent: Feb. 12, 1985

[54] PREPARATION OF EPOXY RESINS

[75] Inventors: Chun S. Wang, Lake Jackson; Ha Q. Pham, Richwood; James L. Bertram, Lake Jackson, all of Tex.

[73] Assignee: The Dow Chemical Company, Midland, Mich.

[21] Appl. No.: 523,910

[22] Filed: Aug. 16, 1983

Related U.S. Application Data

[63] Continuation-in-part of Ser. No. 515,324, Jul. 19, 1983, abandoned, which is a continuation-in-part of Ser. No. 417,015, Sep. 13, 1982, abandoned.

[51] Int. Cl.³ .................... C08G 59/06; C08G 59/10
[52] U.S. Cl. .................................... 528/95; 525/507; 525/519; 528/99; 528/409; 549/514; 549/517
[58] Field of Search ................ 528/95, 99, 409; 525/507, 519; 549/514, 517

[56] References Cited

U.S. PATENT DOCUMENTS

| | | | |
|---|---|---|---|
| 2,801,227 | 7/1957 | Goppel | 528/95 X |
| 2,824,855 | 2/1958 | Freeman et al. | 528/87 X |
| 2,848,435 | 8/1958 | Griffin et al. | 260/47 |
| 3,121,727 | 2/1964 | Baliker et al. | 260/348.6 |
| 3,417,050 | 12/1968 | Price et al. | 528/95 |
| 3,980,679 | 9/1976 | Becker | 549/517 |
| 4,390,680 | 6/1983 | Nelson | 528/97 |

Primary Examiner—Earl A. Nielsen
Attorney, Agent, or Firm—J. G. Carter

[57] ABSTRACT

Epoxy resins are prepared by reacting an excess of an epihalohydrin with a phenolic hydroxyl-containing compound in the presence of the incremental addition of a basic catalyst while removing water by codistilling with a solvent and epihalohydrin.

12 Claims, No Drawings

PREPARATION OF EPOXY RESINS

CROSS REFERENCE TO RELATED APPLICATION

This is a continuation-in-part of application Ser. No. 515,324 filed July 19, 1983, now abandoned, which is a continuation-in-part of application Ser. No. 417,015 filed Sept. 13, 1982, now abandoned.

BACKGROUND OF THE INVENTION

The present invention pertains to the preparation of glycidyl ethers.

The preparation of glycidyl ethers by the reaction of an aromatic hydroxyl-containing compound with epihalohydrin in the presence of a base is well known as disclosed by Lee and Neville in *HANDBOOK OF EPOXY RESINS*, McGraw-Hill, 1967. Because of increased material costs and since in most instances, the reaction is conducted in excess epihalohydrin, any increase in epihalohydrin yields provide for a considerable economy in manufacturing costs. Also, particularly when the epoxy resin is to be employed in electrical applications, it is desired that the epoxy resin have low hydrolyzable halide levels. The present invention provides a process for maximizing epihalohydrin yields and also produces epoxy resins low in hydrolyzable halide.

SUMMARY OF THE INVENTION

The present invention pertains to an improvement in a method for preparing glycidyl derivatives of compounds having at least one aromatic hydroxyl group or aromatic amine group per molecule by reacting at least one compound having at least one aromatic hydroxyl group or aromatic amine group per molecule with an excess of at least one epihalohydrin in the presence of an alkali metal hydroxide and subsequently recovering the glycidyl derivatives; wherein the improvement resides in (1) conducting the reaction in the presence of an organic solvent which codistills with water and said epihalohydrin at a boiling point below the boiling point of the lowest boiling compound among the components in the reaction mixture;

(2) conducting the reaction under a reduced pressure sufficient to provide a distillate with a boiling point of from about 45° C. to about 80° C., preferably from about 55° to about 70° C.;

(3) employing said alkali metal hydroxide as an aqueous solution and adding said aqueous alkali metal hydroxide in a continuous or intermittent manner over a period of from about 0.5 to about 10, preferably from about 1 to about 5 hours;

(4) continuously removing water by means of codistillation at a rate such that the water content in the reaction mixture is less than about 6%, preferably from about 1.5 to about 4 percent by weight;

(5) separating the water from the distillate and returning the solvent and epihalohydrin to the reaction mixture.

DESCRIPTION OF THE PREFERRED EMBODIMENTS

Suitable compounds having at least one aromatic hydroxyl group which can be employed herein include, for example, phenols, bisphenols, novolac resins, polyvinyl phenols, the corresponding amine compounds and the like, such as those represented by the following formulas:

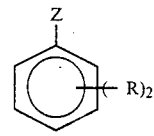

I.

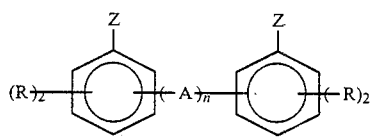

II.

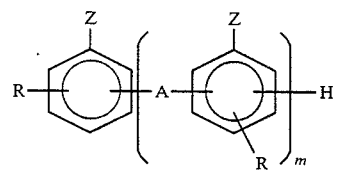

III.

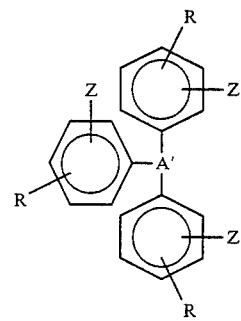

IV.

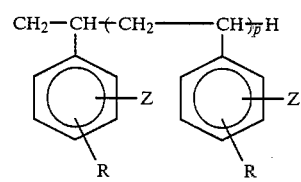

V.

wherein each A is independently a divalent hydrocarbon group having from 1 to about 12, preferably from 1 to about 6 carbon atoms, —O—, —S—, —S—S—,

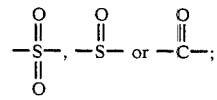

A' is a trivalent hydrocarbon group having from 1 to about 12, preferably from 1 to about 6, carbon atoms; each R is independently hydrogen, a hydrocarbyl group having from 1 to about 10, preferably from 1 to about 4, carbon atoms, a halogen atom, preferably chlorine or bromine or a hydroxyl group or an amino group; each Z is independently —OH or $NH_2$; p has a value of from about 1 to about 100, preferably from about 2 to about 50; m has a value from about 1.00 to about 6 and n has a value of zero or 1.

Also suitable as compounds having at least one aromatic hydroxyl or aromatic amine group per molecule are those represented by the formulas

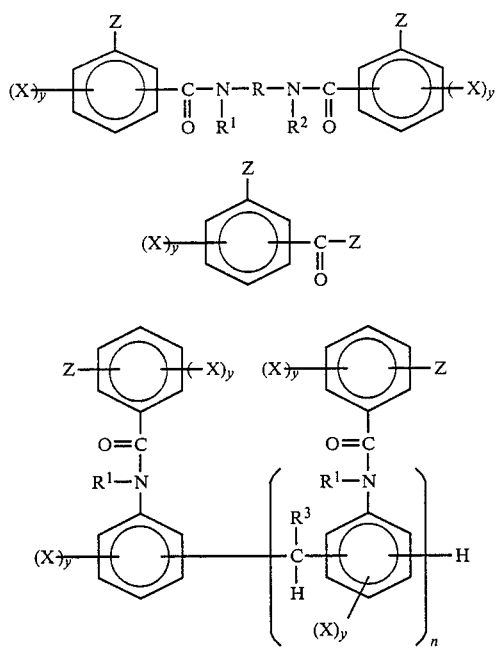

VI.

VII.

VIII.

wherein each R is a divalent hydrocarbyl group having from 1 to about 18, preferably from about 2 to about 12 and most preferably from about 2 to about 6 carbon atoms, a group represented by the following formulas IX, X, XI or XII

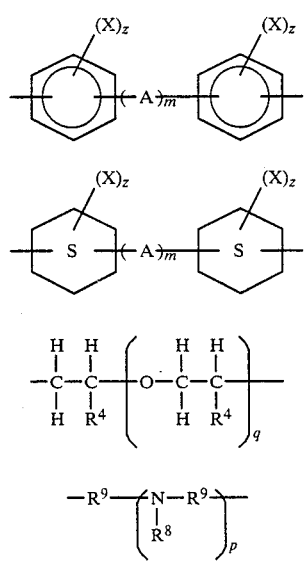

IX.

X.

XI.

XII.

or R can combine with $R^1$ so as to form a stable heterocyclic ring with the nitrogen atoms; each A is independently a divalent hydrocarbyl group having from 1 to about 10, preferably from 1 to about four carbon atoms, —O—, —S—, —S—S—,

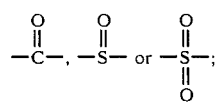

each $R^1$ is independently hydrogen, a 2,3,-epoxypropyl group, a 2-alkyl-2,3-epoxypropyl group, a monovalent hydrocarbyl group or a hydroxyl substituted monovalent hydrocarbyl group, said hydrocarbyl groups having from 1 to about 9 carbon atoms, said alkyl having from 1 to about 4, preferably 1 to about 3 carbon atoms; each $R^2$ is independently hydrogen or an alkyl group having from 1 to about 4, preferably 1 to about 3 carbon atoms; each $R^3$ is independently hydrogen or an alkyl group having from 1 to about 4 carbon atoms; each $R^4$ is independently hydrogen, a hydrocarbyl or halogen substituted hydrocarbyl group having from 1 to about 9, preferably from 1 to about 2 carbon atoms; each $R^8$ is independently selected from the group represented by formula XIV or the same groups as $R^1$ except that $R^8$ cannot be a hydrogen; each $R^9$ is independently a divalent hydrocarbyl group having from 2 to about 4, preferably 2 carbon atoms; each Z is independently —OH or —$NH_2$; each X is independently hydrogen, chlorine, bromine or a hydrocarbyl or a hydrocarbyloxy group having from 1 to about 9, preferably 1 to about 6 carbon atoms; each m independently has a value of zero or 1; n has an average value of from about 0.01 to about 6, preferably 0.1 to about 4; p has an average value of from 1 to about 10, preferably from 1 to about 3; q has an average value of at least 1, preferably from 1 to about 150, most preferably from 1 to about 100 and usually from 1 to about 10 and each y and z independently has a value of 1 or 2.

Also suitable are polycyclopentadiene polyphenols or aromatic polyamines represented by the formula

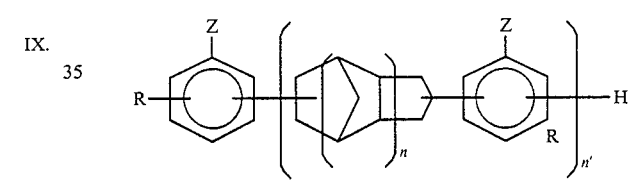

wherein Z is —OH or —$NH_2$ and n has a value from 1 to about 5; n' has a value of from about 1 to about 10, preferably from 3 to about 6; each R is independently hydrogen, a hydrocarbyl group having from 1 to about 10, preferably from 1 to about 4 carbon atoms, a halogen atom, preferably chlorine or bromine or a hydroxyl group or an amino group.

Suitable such polycyclopentadiene polyphenols and methods for their preparation can be found in U.S. Pat. No. 4,390,680 issued to Donald L. Nelson on June 28, 1983 which is incorporated herein by reference. The polycyclopentadiene aromatic polyamines can be prepared in a similar manner by substituting an aromatic amine for the phenolic compound.

Also suitable are compounds containing both at least one aromatic hydroxyl group and at least one aromatic amine group such as, for example, hydroxy aniline, aminoxylenol and the like.

Suitable epihalohydrins which can be employed herein include those represented by the following formula

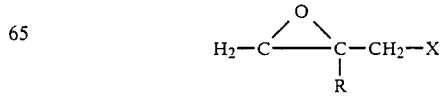

wherein R is hydrogen or a hydrocarbyl group having from 1 to about 4 carbon atoms and X is a halogen, preferably chlorine or bromine.

The epihalohydrin and the aromatic hydroxyl or aromatic amine compound are employed in a molar ratio of from about 2:1 to about 10:1, preferably from about 2:1 to about 6:1, respectively.

Suitable alkali metal hydroxides which can be employed herein include, for example, sodium hydroxide, potassium hydroxide, lithium hydroxide or mixtures thereof. The alkali metal hydroxide is employed as an aqueous solution, usually at a concentration of from about 20 to about 50, preferably from about 40 to about 50 percent by weight.

The amount of alkali metal hydroxide which is employed in the process of the present invention is from about 0.80 mole to about 1.2 mole of alkali metal hydroxide, preferably from about 0.90 mole to 1.0 mole per each aromatic hydroxyl group and aromatic amine hydrogen.

The alkali metal hydroxide can be added either continuously or incrementally, but never is all of the alkali metal hydroxide added in one increment.

Suitable solvents which can be employed herein include any solvent which does not react with any component in the reaction mixture, is partially or wholly miscible with water, forms a codistillate with the epihalohydrin and water and the distillate has a boiling point below that of the lowest boiling component of the reaction mixture at the pressure employed. Suitable such solvents include primary and secondary alcohols such as, for example, 1-methoxy-2-hydroxy propane, 1-butoxy-2-hydroxy ethane, cyclohexanol. The secondary alcohols are preferred.

The amount of solvent which is employed will depend on the particular solvent and hydroxyl or amino compound being employed. The solvent generally ranges from about 5 to about 50 weight percent, preferably from about 10 to about 40 weight percent based on the total weight of reactants.

Suitable pressures which are employed in the process of the present invention is that which will provide the codistillate with a boiling point of from about 45° C. to about 80° C., preferably from about 55° C. to about 70° C.

The reaction is conducted for a length of time such that the quantity of phenolic hydroxyl groups remaining in the reaction mixture is not greater than about 0.5, preferably not greater than about 0.2 percent by weight.

Upon completion of the reaction, the resultant epoxy resin is finished in any of the methods normally employed. The excess epihalohydrin is usually removed by distillation and the salt removed by filtration, centrifugation and/or water washing.

The following examples are illustrative of the present invention, but are not to be construed as to limiting the scope thereof in any manner.

The following components were employed in the examples and comparative experiments.

PHENOLIC COMPOUND A was a phenol-formaldehyde novolac resin having an average hydroxyl equivalent weight of about 104.5 and an average phenolic hydroxyl functionality of about 5.7.

PHENOLIC COMPOUND B was a phenol-formaldehyde novolac resin having an average hydroxyl equivalent weight of about 101 and an average phenolic hydroxyl functionality of about 3.6.

PHENOLIC COMPOUND C was bisphenol A.

PHENOLIC COMPOUND D was 4,4'-dihydroxybiphenyl.

PHENOLIC COMPOUND E was a cresol-formaldehyde novolac resin having an average hydroxyl equivalent weight of about 118.5 and an average phenolic hydroxyl functionality of about 5.7.

PHENOLIC COMPOUND F was a composition containing about 60 to 70 weight percent of tri(hydroxyphenyl) methane, the remaining 30–40% being higher homologs thereof.

PHENOLIC COMPOUND G was a polycyclopentadiene polyphenol resin having an average hydroxyl equivalent weight of about 180 and an average phenolic hydroxyl functionality of about 3.2

PHENOLIC COMPOUND H was polycyclopentadiene polyresorcinol resin having an average hydroxyl equivalent weight of about 93 and an average phenolic hydroxyl functionality of about 5.5.

EXAMPLE 1

Into a one liter reaction vessel equipped with temperature and pressure control and indicating means, a means for the continuous or intermittent addition of aqueous sodium hydroxide, a means for condensing and separating water from a codistillate mixture of water, solvent and epichlorohydrin and a means for returning the solvent and epihalohydrin to the reaction vessell was added 104.5 grams (1 equivalent) of phenolic compound A, 370 grams (4 equivalents) of epichlorohydrin and 247 grams of the methylether of propylene glycol (1-methoxy-2-hydroxy propane) as a solvent. After stirring at room temperature and atmospheric pressure to thoroughly mix the contents, the temperature was raised to 65° C. and the pressure was reduced to 160 mm Hg absolute. To the resultant solution was continuously added 76 grams, 0.95 equivalent of a 50% aqueous sodium hydroxide solution at a constant rate over a period of 1 hour (3600 s). During the addition of the sodium hydroxide, the water was removed by codistilling with epichlorohydrin and solvent. The distillate was condensed thereby forming two distinct phases, an aqueous phase (top) and an organic epichlorohydrin-solvent phase (bottom). The organic phase was continuously returned to the reactor. After completion of the sodium hydroxide addition, the reaction mixture was maintained at a temperature of 65° C. and a pressure of about 160 mm Hg absolute for an additional 30 minutes (1800 s). A sample of the reaction mixture was washed to remove salt and subsequently distilled resulting in an epoxidized novolac resin having a hydrolyzable chloride content of 0.02% and an epoxide content of 23.5% which corresponds to an epoxide equivalent weight of about 183. The epichlorohydrin yield was 99% based on an analysis of the reaction mixture for formation of by-products such as glycidol, glycerine monochlorohydrin and glycerine diglycidylether.

COMPARATIVE EXPERIMENT A (No solvent)

In a manner similar to Example 1, the following components and reaction conditions were employed.

104.5 grams (1 equiv.) of phenolic compound A
462.5 grams (5 equiv.) of epichlorohydrin
76 grams (0.95 equiv.) of 50% aqueous sodium hydroxide The reaction temperature was 65° C. and the reaction pressure was 160 mm Hg absolute. The sodium hydroxide was added over a period of 1 hour (3600 s) and the reaction continued thereafter for a period of 5 hours (18,000 s). During the addition of the sodium hydroxide, the water and epichlorohydrin formed a binary azeotrope which was condensed to form two distinct phases. The organic, epichlorohydrin, (bottom) phase was continuously returned to the reaction mixture.

Even after the 5 hours of additional reaction, only 80% of the phenol-formaldehyde novolac had reacted and the epichlorohydrin yield was only about 80%.

COMPARATIVE EXPERIMENT B (105° reaction at atmospheric pressure)

In a manner similar to Example 1, the following components and reaction conditions were employed.
- 104.5 g (1 equiv.) phenolic compound A
- 370 g (4 equiv.) epichlorohydrin
- 247 g propylene glycol methylether (1-methoxy-2-hydroxy propane)
- 76 g (0.95 equiv.) 50% aqueous sodium hydroxide The reaction temperature was 105° C., the reaction pressure was atmospheric; and the sodium hydroxide was added continuously over a period of 1 hour (3600 s). During the addition of sodium hydroxide, the water, epichlorohydrin and propylene glycol methylether formed a codistillate which was condensed. The epichlorohydrin and propylene glycol methylether from overhead was recycled to the reaction mixture while the aqueous phase was discarded. After the completion of sodium hydroxide addition, the reaction mixture was further stirred at 105° until all of the caustic has been used up (10–15 minutes, 600–900 s). A sample was taken and analyzed for by-product formation (glycidol, glycerine monochlorohydrin, glycerine and glycerine diglycidyl ether . . . ). Besides ~5% epichlorohydrin hydrolysis product, approximately 6% of epichlorohydrin polymers were observed which indicated a yield on epichlorohydrin of ~89%. A sample of the reaction mixture was washed to remove salt and then distilled to give an epoxy novolac with a hydrolyzable chloride content of 0.2% (10 times higher than the one under a reduced pressure) and an epoxide content of 21.6%.

COMPARATIVE EXPERIMENT C (solvent present, but no codistillation)

The procedure of Comparative Experiment B was followed except that the reaction was carried out at 65° C., but no water was removed by codistillation. The water from the sodium hydroxide addition and the water of reaction remained in the reaction mixture. The yield of epichlorohydrin was 92%. A sample of the reaction mixture was washed to remove salt and then distilled thereby resulting in an epoxidized novolac having a hydrolyzable chloride content of 0.1% (5 times that produced in Example 1).

EXAMPLE 2

In a manner similar to Example 1, the following components and conditions were employed.
- 51 grams (0.5 equiv.) of phenolic hydroxyl compound B 231.5 grams (2.5 equiv.) of epichlorohydrin
- 75 grams cyclohexanol
- 38 grams (0.475 equiv.) of 50% aqueous sodium hydroxide The reaction temperature was 60° C. and the reaction pressure was about 155 mm Hg. The sodium hydroxide was added over a period of 1 hour (3600 s) and the reaction continued for an additional 15 minutes (900 s). The product had an epoxide content of 24.51 percent which corresponds to an equivalent weight of about 175 and a hydrolyzable chloride content of about 0.02%. The epichlorohydrin yield was 98%.

EXAMPLE 3

In a manner similar to Example 1, the following components and conditions were employed.
- 114 grams (1 equiv.) of phenolic compound C
- 370 grams (4 equiv.) of epichlorohydrin
- 247 grams of propylene glycol methylether (1-methoxy-2-hydroxy propane)
- 80 grams (1 equiv.) of 50% aqueous sodium hydroxide The reaction temperature was 65° C. and the reaction pressure was about 160 mm Hg absolute. The sodium hydroxide was added over a period of one hour (3600 s) and the reaction was continued for an additional 15 minutes (900 s).

The product had an epoxide content of 24% corresponding to an epoxide equivalent weight of about 179 and a hydrolyzable chloride content of 0.02%. The epichlorohydrin yield was 99%.

EXAMPLE 4

In a manner similar to Example 1, except where noted, the following components and conditions were employed.
- 93 grams (1 equiv.) of phenolic compound D
- 370 grams (4 equiv.) of epichlorohydrin
- 330 grams of propylene glycol methylether (1-methoxy-2-hydroxy propane)
- 80 grams (1 equiv.) 50% aqueous sodium hydroxide The reaction temperature was 70° C. and the reaction pressure was 190 mm Hg absolute. The sodium hydroxide was added over a period of 1 hour (3600 s). The reaction was continued for an additional 15 minutes (900 s). The product was insoluble, and precipitated from the reaction mixture; therefore, 330 grams of water was added to the reaction mixture to facilitate the precipitation thereof and the mixture was cooled to 30° C. The solid was suction filtered, washed on the filter with water and methanol and then dried in a vacuum oven thereby producing a white solid having a softening point of 155° C., an epoxide content of 26.4% corresponding to an epoxide equivalent weight of about 163. The hydrolyzable chloride content was 0.02%. The epichlorohydrin yield was 98%.

EXAMPLE 5

4,4'-methylenedianiline (99.2 g, 0.5 mole), epichlorohydrin (370 g, 4 eq.) and 1-methoxy-2-hydroxypropane (92.5 g) were stirred under atmospheric pressure to achieve a complete solution. The solution was heated to 80° and maintained at that temperature for 3 hours (10800 s). The reaction was then cooled to 65° and under a reduced pressure of 160 mm Hg absolute. Aqueous sodium hydroxide (50% concentration, 176 g, 1.1 eq.) was added to the reaction mixture at a constant rate over a period of 1 hour (3600 s). During the addition of caustic, the water was removed by codistilling with epichlorohydrin and 1-methoxy-2-hydroxypropane. The distillate was condensed and the organic phase was continuously returned to the reaction mixture. After the addition of caustic was completed, the reaction mixture was further stirred at 65°, 160 mm Hg for another 15 minutes. Work-up of product as in Example 1 gave a product with 34.8% epoxide.

EXAMPLE 6

In a manner similar to Example 1, the following components and conditions were employed.
- 59.3 grams (0.5 equiv.) of cresol-formaldehyde novolac (phenolic compound E)
- 185 grams (2.0 equiv.) of epichlorohydrin
- 46 grams 1-methoxy-2-hydroxypropane
- 38 grams (0.475 equiv.) of 50% aqueous sodium hydroxide The reaction temperature was 65° C. and the reaction pressure was about 180 mm Hg. The sodium hydroxide was added over a period of 1 hour (3600 s) and the reaction continued for an additional 15 minutes (900 s). The water content in the reaction mixture was found to be 1.3%.

The product had an epoxide content of 20.5% corresponding to an epoxide equivalent weight of about 210 and a hydrolyzable chloride content of 0.02%. The epichlorohydrin yield was 98%.

EXAMPLE 7

In a manner similar to Example 1, the following components and conditions were employed.
- 97.3 grams (1.0 equiv.) of tri(hydroxyphenyl)methane (phenolic compound F)
- 555 grams (6.0 equiv.) of epichlorohydrin
- 139 grams 1-methoxy-2-hydroxypropane
- 76 grams (0.95 equiv.) of 50% aqueous sodium hydroxide.

The reaction temperature was 65° C. and the reaction pressure was 195 mm Hg. The sodium hydroxide was added over a period of 1 hour (3600 s) and the reaction continued for an additional 30 minutes (1800 s). The water content in the reaction mixture was found to be 1.9%.

The product had an epoxide content of 26.5% corresponding to an epoxide equivalent weight of about 162 and a hydrolyzable chloride content of 0.02%. The epichlorohydrin yield was 98%.

EXAMPLE 8

In a manner similar to Example 1, except where noted, the following components and conditions were employed.
- 90 grams (0.5 equiv.) of polycyclopentadiene polyphenol (phenolic compound G)
- 185 grams (2.0 equiv.) of epichlorohydrin
- 46 grams propylene glycol methylether
- 38 grams (0.475 equiv.) of 50% aqueous sodium hydroxide The reaction temperature was 65° C. and the reaction pressure was about 180 mm Hg. The sodium hydroxide was added over a period of 1 hour (3600 s) and the reaction continued for an additional 30 minutes (1800 s). The product had a softening point of about 85° C. with an epoxide content of 15.8 percent and a hydrolyzable chloride content of about 0.02%. The epichlorohydrin yield was 98%.

EXAMPLE 9

In a manner similar to Example 1, except where noted, the following components and conditions were employed.
- 93 grams (1.0 equiv.) of polycyclopentadiene polyresorcinol (phenolic compound H)
- 370 grams (4.0 equiv.) of epichlorohydrin
- 92 grams propylene glycol methyl ether
- 76 grams (0.95 equiv.) of 50% aqueous sodium hydroxide The reaction temperature was 65° C. and the reaction pressure was about 180 mm Hg. The sodium hydroxide was added over a period of 1 hour (3600 s) and the reaction continued for an additional 30 minutes (1800 s). The product had a softening point of about 89° with an epoxide content of 24.7 percent and a hydrolyzable chloride content of about 0.02%. The epichlorohydrin yield was 98%.

EXAMPLE 10

(Effect of water content in the reaction mixture on the yield and insoluble polymer formation)

A series of experiments were conducted in a manner similar to Example 1 except that the amount of water in the reaction vessel was varied. The following components and reaction conditions were employed.
- 104.5 grams (1 equiv.) of phenolic compound A
- 370 grams (4 equiv.) of epichlorohydrin
- 92.5 grams of the methylether of propylene glycol (1-methoxy-2-hydroxy propane) as a solvent After stirring at room temperature and atmospheric pressure to thoroughly mix the components, the temperature was raised to 65° and the pressure was reduced to a predetermined value. To the resultant solution was continuously added 76 grams, 0.95 equivalent, of a 50% aqueous sodium hydroxide solution at a constant rate over a period of two hours (7200 s). During the addition of the sodium hydroxide, the water was removed by codistilling with epichlorohydrin and solvent. The distillate was condensed thereby forming two distinct phases. The organic phase (bottom) was continuously returned to the reactor. After completion of the sodium hydroxide addition, the reaction mixture was maintained at a temperature of 65° for an additional 30 minutes (1800 s). A sample was taken for analysis of by-products to determine the epichlorohydrin yield and the rest of reaction mixture was washed to remove salt and subsequently distilled resulting in an epoxidized novolac resin. Results of experiments were as follows:

| Reaction Pressure (mm Hg Abs.) | H$_2$O Content in Reactor (%) | Hydrolyzable Chloride (%) | Insoluble Polymer (%) | Epichlorohydrin Yield (%) |
|---|---|---|---|---|
| 180 | 1.2 | 0.02 | 1.6 | 98 |
| 185 | 1.56 | 0.02 | 0.6 | 99 |
| 195 | 2.0 | 0.02 | 0.76 | 99 |
| 215 | 3.5 | 0.05 | <0.1 | 98.5 |
| 220 | 4.0 | 0.05 | <0.1 | 98 |
| 240 | 6.0 | 0.80 | <0.1 | 94 |

At too low a water content, epichlorohydrin yield is high but insoluble polymer formation requires filtration in order to remove the polymer. At water contents of between 1.5–4.0%, the epichlorohydrin yields are 98% or above and insoluble polymer formation is less than 1%. A water content of 6% and above in the reaction mixture resulted in reduced epichlorohydrin yield and also increased the hydrolyzable chloride content of the resultant product.

We claim:

1. In a method for preparing glycidyl derivatives of compounds having at least one aromatic hydroxyl group or aromatic amine group per molecule by reacting at least one compound having at least one aromatic hydroxyl group or aromatic amine group per molecule with an excess of at least one epihalohydrin in the presence of an alkali metal hydroxide and subsequently recovering the glycidyl derivative product; the improvement which comprises (1) conducting the reaction in the presence of an organic solvent which codistills with water and said epihalohydrin at a boiling point below the boiling point of the lowest boiling compound among the components in the reaction mixture;

(2) conducting the reaction under a reduced pressure sufficient to provide a distillate with a boiling point of from about 45° C. to about 80° C.;

(3) employing said alkali metal hydroxide as an aqueous solution and adding said aqueous alkali metal hydroxide in a continuous or intermittent manner over a period of from about 0.5 to about 10 hours;

(4) continuously removing water by means of codistillation at a rate such that the water content in the reaction mixture is less than about 6 percent by weight;

(5) separating the water from the codistillate and returning the solvent and epihalohydrin to the reaction mixture.

2. A process of claim 1 wherein (a) said epihalohydrin is epichlorohydrin, (b) said compound having at least one aromatic hydroxyl group or aromatic amine group is a compound having at least one aromatic hydroxyl group, (c) said alkali metal hydroxide is sodium hydroxide, (d) the temperature is from about 55° to about 70° C., (e) the aqueous alkali metal hydroxide is added over a period of from about 1 to about 5 hours and (f) water is removed at a rate such that the water content in the reaction mixture is from about 1.5% to about 4% by weight.

3. A process of claim 2 wherein said compound having at least one aromatic hydroxyl group per molecule is a bisphenol or a phenol-formaldehyde novolac resin.

4. A process of claim 2 wherein said compound having at least one aromatic hydroxyl group per molecule is a cresol-formaldehyde novolac resin.

5. A process of claim 2 wherein said compound having at least one aromatic hydroxyl group per molecule is a tri(hydroxyphenyl)methane or mixture thereof with its higher homologs.

6. A process of claim 2 wherein said compound having at least one aromatic hydroxyl group per molecule is 4,4'-dihydroxybiphenyl or hydrocarbon or halogen ring substituted derivative thereof.

7. A process of claim 2 wherein said compound having at least one aromatic hydroxyl group per molecule is 4,4'-methylenedianiline or hydrocarbon or halogen ring substituted derivative thereof.

8. A process of claim 2 wherein said compound having at least one aromatic hydroxyl group per molecule is a polycyclopentadiene polyphenol resin.

9. A process of claim 2 wherein said compound having at least one aromatic hydroxyl group per molecule is a polycyclopentadiene polyresorcinol resin.

10. A process of claims 1, 2, 3, 4, 5, 6, 7 8 or 9 wherein said organic solvent is a secondary alcohol.

11. A process of claim 10 wherein said organic solvent is cyclohexanol, 1-methoxy-2-hydroxy propane or mixture thereof.

12. A process of claim 11 wherein said organic solvent is 1-methoxy-2-hydroxy propane.

* * * * *

US004499255B1

REEXAMINATION CERTIFICATE (3970th)

United States Patent [19]
Wang et al.

[11] B1 4,499,255
[45] Certificate Issued Jan. 11, 2000

[54] PREPARATION OF EPOXY RESINS

[75] Inventors: Chun S. Wang, Lake Jackson; Ha Q. Pham, Richwood; James L. Bertram, Lake Jackson, all of Tex.

[73] Assignee: The Dow Chemical Company

Reexamination Requests:
No. 90/004,973, Apr. 23, 1998
No. 90/005,132, Nov. 20, 1998
No. 90/005,313, Mar. 12, 1999

Reexamination Certificate for:
Patent No.: 4,499,255
Issued: Feb. 12, 1985
Appl. No.: 06/523,910
Filed: Aug. 16, 1983

Related U.S. Application Data

[63] Continuation-in-part of application No. 06/515,324, Jul. 19, 1983, abandoned, which is a continuation-in-part of application No. 06/417,015, Sep. 13, 1982, abandoned.

[51] Int. Cl.[7] ............................. C08G 59/06; C08G 59/10
[52] U.S. Cl. ........................... 528/95; 528/99; 528/409; 549/514; 549/517; 525/507; 525/519
[58] Field of Search ........................... 549/514, 517; 528/95, 98, 99, 409; 525/507, 519

[56] References Cited

U.S. PATENT DOCUMENTS

| | | | |
|---|---|---|---|
| 2,898,349 | 8/1959 | Zuppinger et al. | 260/348.6 |
| 2,951,822 | 9/1960 | Reinking | 260/42 |
| 4,110,354 | 8/1978 | Bertram et al. | 260/348.16 |
| 4,132,718 | 1/1979 | Vargiu et al. | 260/348.15 |
| 4,137,220 | 1/1979 | Lazzerini et al. | 528/135 |
| 4,250,100 | 2/1981 | Bertram et al. . | |
| 4,273,921 | 6/1981 | Bertram et al. | 528/405 |
| 4,284,573 | 8/1981 | Arnett et al. . | |
| 4,388,209 | 6/1983 | Rogier . | |
| 4,408,062 | 10/1983 | Bertram et al. | 549/517 |
| 4,447,598 | 5/1984 | Caskey et al. . | |
| 4,468,508 | 8/1984 | Ito et al. | 525/507 |
| 4,499,255 | 2/1985 | Wang et al. | 528/95 |
| 4,585,838 | 4/1986 | Wang et al. | 525/507 |
| 4,684,701 | 8/1987 | Wang et al. | 525/507 |
| 4,876,371 | 10/1989 | Ito et al. | 549/517 |
| 5,028,686 | 7/1991 | Liao et al. | 528/92 |

FOREIGN PATENT DOCUMENTS

| | | |
|---|---|---|
| 37516/78 | 6/1977 | Australia . |
| 42634/78 | 12/1977 | Australia . |
| 105757 | 6/1962 | Czechoslovakia . |
| 1 081 666 | 5/1960 | Germany . |
| 31-3666 | 5/1956 | Japan . |
| 40-14748 | 7/1965 | Japan . |
| 59-40831 | 10/1984 | Japan . |
| 62-34330 | 6/1987 | Japan . |
| 908389 | 10/1962 | United Kingdom . |
| 1063540 | 3/1967 | United Kingdom . |
| 1256026 | 12/1971 | United Kingdom . |
| 1277668 | 6/1972 | United Kingdom . |
| 1 453 882 | 10/1976 | United Kingdom . |
| 1485345 | 9/1977 | United Kingdom . |
| 1 509 475 | 5/1978 | United Kingdom . |

OTHER PUBLICATIONS

Fred W. Billmeyer, Jr. "Textbook of Polymer Science" Second Edition, (1971), pp 468–488.

Ivo Wiesner, "Some Problems in the Preparation of Low Molecular Weight Expoxide Resins by Azeotropic Condensation of Epichlorohydrin with 2,2–bis(4–hydroxyphenyl) propane (bisphenol A)", Chemicky Prumysl 32 (57) (Mar. 1982), (certified translation of Czech language document).

Wiesner, I., "Effect of some solvents on the reaction of epichlorohydrin with 2,2–bis(4–hydroxyphenyl)propane", Chem. Prum., 20(6), pp. 266–270 (1970), Abstract No. 73:110195 CA.

Wiesner, I. Et al., "Some rules governing the formation of epoxide resins", Chem. Prum., 15(2), pp. 719–722 (1965).

Wiesner, I., "Resins with a high content of diglycidyl ether of bisphenol", Chem. Prum., 13(38), No. 12, pp. 666–669 (1963).

Wiesner, I., "Regularities in the synthesis of epoxy resins", Polimery, 12(7), pp. 306–309 (1967), Abstract No. 68:69606.

Sorokin, M.F., et al., "Reaction of epichlorohydrin with phenol in an alkaline medium", Kinet. Katal., 17(2), pp. 321–328 (1976), Abstract No. 85:433511 CA.

Sorokin, M.F., et al., "Study of side reactions occurring during the synthesis of epoxy oligomers in a water–acetone medium", Viniti, pp. 731–779, No. 14 (1979), Abstract No. 92:129719.

Sorokin, M.F., "Kinetic determination of the pKa of dian in a water–dioxane mixture at different temperatures", Viniti, pp. 976–974, No. 8 (1974), Abstract No. 86:188915 CA.

Rozentuler, S.M., "Synthesis of epoxy resins in a heterogeneous liquid–liquid system", ZH. Pril. Khim, 42(8), pp. 1881–1887 (1969), Abstract No. 72:3997 CA.

Rozentuler, S.M., "Topochemical features of the synthesis of epoxy–dihydroxydiphenylpropane resins in a liquid–phase medium", ZH. Prikl, Khim, 46(12), pp. 2731–2734 (1973), Abstract No. 80:108924 CA.

Toxmyulrt, S.M., "Effect of temperature on the course of individual states in the sythesis of epoxy resins in a heterogeneous liquid–liquid system", ZH. Prikl. Khim, 43(7), pp. 1554–1558 (1970), Abstract No. 73:885276 CA.

Rozentuler, S.M., "Effect of solvents on the synthesis of epoxy–dian resins in a liquid–phase system", ZH. Prikl. Khim, 47(1), pp. 187–191 (1974), Abstract No. 81:13855 CA.

Rozentuler, S.M., "Effect of the nature of the solvent on the rate of the reaction of 1–phenoxy–3–chloro–2–propanol with alkali", ZH. Prikl. Khim, 5(11), pp. 1923–1926 (1969), Abstract No. 72:54419 CA.

(List continued on next page.)

*Primary Examiner*—Randy Gulakowski

[57] ABSTRACT

Epoxy resins are prepared by reacting an excess of an epihalohydrin with a phenolic hydroxyl-containing compound in the presence of the incremental addition of a basic catalyst while removing water by codistilling with a solvent and epihalohydrin.

OTHER PUBLICATIONS

Rozentuler, S.M., "Synthesis parameters of epoxy resins based on bisphenol A in a two-phase liquid system", Polimery, 20(4), pp. 165–169 (1975), Abstract No. 83:193837 CA.

Rogovina, S.Z., "Effect of solvents on the rates of reactions modeling the synthesis of epoxy resins", IZV. Akad. Nauk. SSSR, SER. Khim, (8), pp. 1742–1746 (1975), Abstract No. 83:179677 CA.

Muller, Robert G., "Epoxy Resins", Report No. 38, Stanford Research Institute, Jun. 1968.

31–Synthetic Resins and Plastics, Col. 14982, lines g–i (1961), Abstract of German Patent No. 1081666.

Dictionary on Chemical Engineering, Exhibit A–No. 1, pp. 1–2.

Abstract for DE 1518119 A.

R.F. Sellers & S.G. Smith, "Determination of Hydrolyzable Chlorine in Epoxy Resins" (Reinforced Plastics/Composites Institute, $27^{th}$ Annual Conference, Feb. 8, 1972).

Kirk–Othmer, Encyclopedia of Chemical Technology, vol. 9, *Epoxy Resins* ($3^{rd}$ ed. 1980) pp. 267–290.

D. Helfand and T. Villani, *Epoxy Resins for Molding Applications,* in Proceedings of the $14^{th}$ Electrical/Electronics Insulation Conf. 290–297 (Oct. 8–11, 1979).

Lee and Neville, Handbook of Epoxy Resins (McGraw Hill 1967).

Hawley, The Condensed Chemical Dictionary 668 ($9^{th}$ ed. 1977).

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–6 and 8, 9 is confirmed.

Claim 7 is determined to be patentable as amended.

Claims 10–12, dependent on an amended claim, are determined to be patentable.

7. A process of claim 2 wherein said compound having at least one aromatic [hydroxyl] *amine* group per molecule is 4,4'-methylenedianiline or hydrocarbon or halogen ring substituted derivative thereof.

* * * * *